United States Patent
Jordan et al.

(10) Patent No.: US 6,794,773 B2
(45) Date of Patent: Sep. 21, 2004

(54) WINDING RESTRAINT ON WOUND ROTOR GENERATORS OR MOTORS AND METHOD FOR FORMING THE SAME

(75) Inventors: Lawrence E. Jordan, Amsterdam, NY (US); Paul A. Gennari, Arlington, VA (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 10/053,716

(22) Filed: Jan. 24, 2002

(65) Prior Publication Data

US 2002/0096955 A1 Jul. 25, 2002

Related U.S. Application Data

(63) Continuation-in-part of application No. 09/766,670, filed on Jan. 23, 2001, now abandoned.

(51) Int. Cl.[7] .............................................. H02K 9/00
(52) U.S. Cl. ......................... 310/61; 310/91; 310/271; 310/52; 310/261; 310/51
(58) Field of Search ........................... 310/91, 271, 61, 310/51, 52, 261

(56) References Cited

U.S. PATENT DOCUMENTS

| | | | |
|---|---|---|---|
| 2,119,477 A | | 5/1938 | Weydell |
| 3,062,979 A | | 11/1962 | Jarret et al. |
| 3,132,269 A | | 5/1964 | Craske |
| 3,609,427 A | | 9/1971 | Lautner et al. |
| 3,663,847 A | | 5/1972 | Schaefer |
| 3,900,749 A | | 8/1975 | Carriker |
| 3,940,643 A | * | 2/1976 | Sika et al. ............... 310/52 |
| 3,991,133 A | * | 11/1976 | Laskaris ................. 310/52 |
| 4,051,399 A | | 9/1977 | Stanwick et al. |
| 4,146,809 A | * | 3/1979 | Rielly .................... 310/261 |
| 4,190,829 A | | 2/1980 | Schmitt et al. |
| 4,368,416 A | | 1/1983 | James |
| 4,506,182 A | | 3/1985 | Rohdin |
| 5,359,248 A | | 10/1994 | Nagate et al. |
| 5,487,640 A | | 1/1996 | Shaffer |
| 5,492,004 A | | 2/1996 | Berg et al. |
| 5,508,577 A | * | 4/1996 | Shiga .................... 310/201 |
| 5,650,682 A | | 7/1997 | Smart |
| 5,808,389 A | | 9/1998 | Stephenson |
| 5,844,343 A | | 12/1998 | Horst |
| 5,866,959 A | | 2/1999 | Le Flem |
| 5,880,547 A | | 3/1999 | Shoykhet |
| 5,929,550 A | | 7/1999 | Kaminski et al. |
| 6,175,172 B1 | | 1/2001 | Bakholdin et al. |
| 6,239,527 B1 | | 5/2001 | Kaminski et al. |
| 6,288,461 B1 | | 9/2001 | Mori et al. |
| 6,291,919 B1 | | 9/2001 | Ganti et al. |
| 6,586,853 B2 | * | 7/2003 | Ishida .................... 310/62 |

* cited by examiner

Primary Examiner—Nicholas Ponomarenko
Assistant Examiner—Iraj A. Mohandesi
(74) Attorney, Agent, or Firm—Nixon & Vanderhye P.C.

(57) ABSTRACT

An electric machine and method for forming the same comprises a rotor, a rotor winding disposed on the rotor and having a body portion and end turn portions, and a non-metallic cylinder arranged around the rotor to restrain both the body portion and the end turn portions of the winding against forces resulting from a rotation of the rotor. No portion of an inner circumference of the cylinder is smaller than an outer circumference of the rotor so that the cylinder may be slid around the rotor without obstruction during construction of the electric machine. The cylinder surrounds a body portion of the rotor and extends axially beyond end faces of the rotor and has a plurality of holes defined therethrough. The rotor includes a plurality of venting passages and at least one opening formed therein to allow a balance plug to be engaged therein.

14 Claims, 3 Drawing Sheets

WINDING RESTRAINT ON WOUND ROTOR GENERATORS OR MOTORS AND METHOD FOR FORMING THE SAME

CROSS REFERENCE TO RELATED APPLICATION

This application is a continuation-in-part of U.S. application Ser. No. 09/766,670 filed Jan. 23, 2001 now abandoned, the entire contents of which is hereby incorporated by reference into this application.

BACKGROUND OF THE INVENTION

The present invention relates to electric machines such as electrical power generators or motors, and in particular to a non-metallic cylinder that restrains both a body portion and end turn portions of a rotor winding.

Conventionally, a rotor of an electric machine has a cylindrical shape including a body portion which extends parallel to the rotor's axis of rotation and two end faces which axially oppose each other. The rotor winding includes a body portion which is restrained in the body portion of the rotor and end turn portions which extend axially beyond the end faces of the rotor. The body portion of the rotor windings are restrained in the body of the rotor by metallic wedges and the end turn portions of the rotor winding are restrained by high strength retaining rings made of non-magnetic steel. The rotor winding is thus restrained against the centrifugal forces resulting from the rotation of the rotor through the use of the retaining rings in the end turn area and the wedges in the body portion of the rotor. The retaining rings employed in the end turn area typically account for approximately 15% of the total cost of the rotor. Ironically, the mass of the retaining rings themselves result in approximately 60% of the stress produced on the rings. This mass thus necessitates the material forming the retaining rings to have a high strength and thus results in a high cost.

It has been recognized by those skilled in the art that non-metallic materials, such as graphite filament wound epoxy composites, have the necessary tensile strength to restrain the rotor end turn portions against the forces (e.g., centrifugal forces) resulting from the rotation of the rotor. Furthermore, because the graphite filament wound epoxy composite materials typically have a strength to weight ratio of six times that of steel, the stress produced by their own mass is significantly lower. There would thus be a considerable cost savings if a non-metallic material were used in place of the high strength steel currently employed.

Prior attempts to provide a graphite filament wound epoxy composite in place of high strength steel to restrain the end turn portions of the rotor winding encountered numerous difficulties with a ring locking design. The difficulties focused on stress risers at the locking key and the ability of the material to accommodate stress transverse to the filament axis. The designs to overcome these difficulties resulting from the use of graphite filament wound epoxy composites for restraining the winding end turn portions added cost and complexity that negated the cost savings provided by the material.

It would thus be beneficial to provide a single integral device that provides the functions provided by both the retaining rings and the body wedges and to avoid the difficulties encountered with the locking key arrangement of earlier attempts. It would be beneficial to eliminate the use of body wedges to achieve cost savings and increase the amount of copper in each slot of the rotor. It would be further beneficial to eliminate the use of slot teeth which act in concert with the body wedges to restrain the body portion of the windings against the rotational forces of the rotor.

BRIEF SUMMARY OF THE INVENTION

In accordance with an exemplary embodiment of the present invention, an electric machine comprises a rotor, a rotor winding disposed on the rotor having a body portion and end turn portions, and a non-metallic cylinder arranged around the rotor to restrain both the body portion and the end turn portions of the winding against forces resulting from a rotation of the rotor. The cylinder is made of a graphite epoxy composite and is a single integral cylinder. The rotor includes a body portion which extends along a rotational axis of the rotor and two end faces which axially oppose one another, and the cylinder extends along the rotational axis of the rotor so that the cylinder surrounds the body portion of the rotor and extends axially beyond both of the end faces and the end turn portions of the rotor winding. The electric machine of the exemplary embodiment overcomes the above problems encountered with the locking key arrangement and eliminates the need for the body wedges and corresponding slot to restrain the body portion of the windings to the rotor against its rotational forces. The elimination of the body wedges allows the amount of material forming the winding in each rotor slot to be increased.

The cylinder has a plurality of holes defined therethrough comprising a plurality of ventilation holes and a plurality of balance plug holes. The rotor includes a plurality of slots formed therein for receiving the winding. The plurality of ventilation holes are respectively positioned with respect to a plurality of ventilation through-holes in the winding to form a plurality of ventilation passages. A fan is arranged at an axial end of the cylinder so that the winding can be cooled through the venting passages. The rotor also includes at least one opening formed therein. The opening is aligned with one of the plurality of balance plug holes to allow a balance plug to be engaged into the opening through the one of the plurality of balance plug holes. The rotor includes a groove on its outer periphery and the cylinder includes a protrusion on its inner periphery which engages the groove of the rotor. This allows the cylinder to be effectively secured to the rotor. The electric machine of the exemplary embodiment thus provides the following benefits: (1) the ability to directly cool rotor end windings with increased cooling efficiency and lower cost; (2) decreasing the end turn spindle length of the rotor (by, e.g., five to seven inches) since space for cooling is no longer required; (3) a tighter end turn portion area resulting in lower core end losses; (4) simplified end turn portion blocking; (5) increased pole area for the same amount of copper forming the rotor winding; (6) eliminating the use of retaining ring insulation, ammortissuer winding and creepage blocks (e.g., up 250 parts per rotor); and (7) simplified rotor machining so that no dovetails and potentially no slots are required.

In a further exemplary embodiment of the present invention, a method of forming an electric machine comprises providing a rotor, disposing a rotor winding on the rotor, the rotor winding having a body portion and end turn portions, and arranging a non-metallic cylinder around the rotor to restrain both the body portion and the end turn portions of the winding against forces resulting from a rotation of the rotor. The cylinder is made of a graphite epoxy composite and is a single integral cylinder. The rotor is provided to have a body portion which extends along a rotational axis of the rotor and two end faces which axially oppose one another, and the cylinder is arranged such that the cylinder extends along the rotational axis of the rotor to surround the body portion of the rotor and extends axially beyond both of the end faces and the end turn portions.

The method of the exemplary embodiment further includes defining a plurality of holes through the cylinder comprising a plurality of ventilation holes and a plurality of balance plug holes. A plurality of slots are formed in the rotor for receiving the winding. The plurality of ventilation holes are positioned with respect to the plurality of ventilation through-holes in the winding to form a plurality of ventilation passages and a fan is arranged at an axial end of the cylinder to cool the winding. At least one opening is formed in the rotor and aligned with one of a plurality of balance plug holes. A balance plug is then engaged into the opening through the one of the plurality of balance plug holes. A groove is formed on an outer periphery of the rotor and a protrusion on an inner periphery of the cylinder is engaged with the groove so that the cylinder can be secured on the rotor.

In a further exemplary embodiment of the present invention, an electric machine comprises a rotor, a rotor winding disposed on the rotor, the rotor winding having a body portion and end turn portions, and a non-metallic cylinder arranged around the rotor to restrain both the body portion and the end turn portions of the winding against forces resulting from a rotation of the rotor, wherein no portion of an inner circumference of the cylinder is smaller than an outer circumference of the rotor. In another exemplary embodiment of the present invention, a method of forming an electric machine comprises providing a rotor, disposing a rotor winding on the rotor, the rotor winding having a body portion and end turn portions, and sliding a non-metallic cylinder around the rotor to restrain both the body portion and the end turn portions of the winding against forces resulting from a rotation of the rotor, wherein no portion of an inner circumference of the cylinder is smaller than an outer circumference of the rotor so that the cylinder may be slid around the rotor without obstruction.

BRIEF DESCRIPTION OF THE DRAWINGS

These, as well as other advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
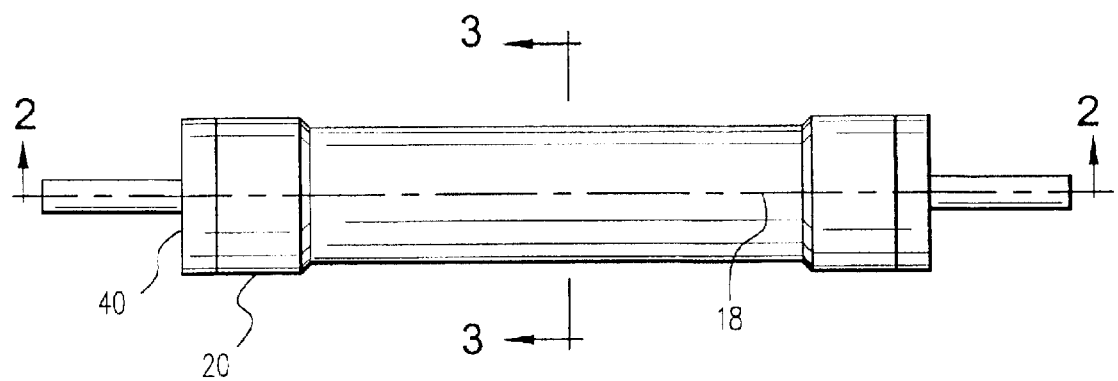
FIG. 1 is a partial perspective side view of a rotor assembly in accordance with an exemplary embodiment of the present invention.

FIG. 1 illustrates a partial perspective side view of an electric machine in accordance with an exemplary embodiment of the present invention. The electric machine of the present invention can be used in air and hydrogen cooled generators and motors having power levels of up to several hundred megawatts and can be used in superconductivity designs. The electric machine includes a rotor 10 that generally has a cylindrical shape and is arranged about a central rotational axis 18. The rotor 10 includes a body portion 12 which extends parallel to the rotational axis 18 and two end faces 14a, 14b which axially oppose each other (see FIG. 2). The rotor 10 also includes a plurality of circumferentially spaced slots 16 for receiving the rotor winding 30 therein. Each of the slots 16 extends axially along the body portion 12 of the rotor 10 and radially outward from the rotational axis 18, and receives a plurality of stacked turns (i.e., stacked conductors) of the rotor winding 30 therein. Each slot 16 includes a stacked portion 16b and a narrower ventilation portion 16a. The rotor winding 30 occupies only the stacked portion 16b.

Figure 2:
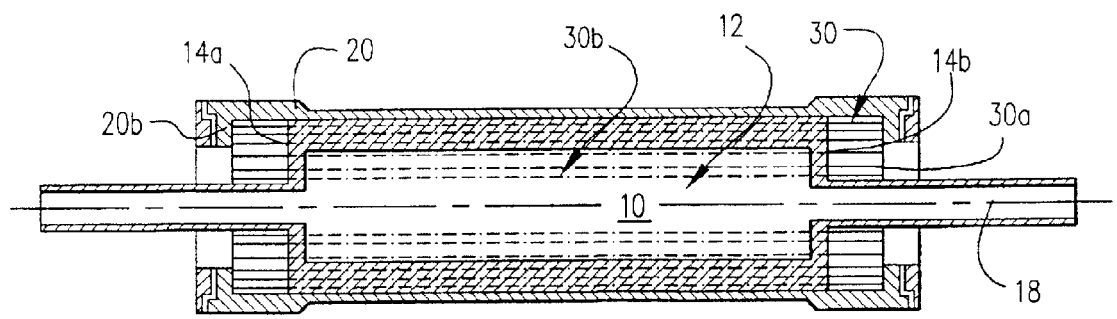
FIG. 2 is a cross-sectional view taken along line 2—2 of the of FIG. 1.

The rotor winding 30 includes a body portion 30b and end turn portions 30a. The body portion 30b of the rotor winding 30 is disposed on the body portion 12 of the rotor 10. As illustrated in FIG. 2, the end turn portions 30a of the rotor winding 30 extend axially beyond the end faces 14a, 14b of the rotor 10, respectively. As noted above, the rotor winding 30 includes a plurality of stacked turns in each slot 16 of the rotor 10. The rotor winding 30 further includes a series of ventilation through-holes 30c axially spaced along the rotor winding 30. Each ventilation through-hole 30c is formed by individual through-holes formed in each stacked conductor.

A non-metallic cylinder 20 is arranged around the rotor 10. Specifically, the non-metallic cylinder 20 has an inner circumference that is disposed on the outer circumference of body portion 12 of the rotor 10. The cylinder 20 is a single integral structure and is preferably made of a high strength, low density material such as a graphite epoxy composite. Graphite epoxy composites have a high hoop strength, largely because they are constructed with circumferentially oriented filaments. The cylinder 20 can thus be made with various material structures, i.e., filaments or clothes of various weaves, etc., at varying angles, resulting in a composite whose material properties can be tailored throughout the construction process.

The construction of the cylinder 20 can be accomplished by a filament winding method on a mandrel of appropriate dimensions. As can be seen in FIG. 2, the cylinder 20 extends axially beyond the end faces 14a, 14b of the rotor 10. The cylinder 20 also extends axially beyond the end turn portions 30a of the rotor winding 30. The cylinder 20 is thus formed of a single integral structure and restrains both the body portion 30b and the end turn portions 30a of the rotor winding 30 against the forces (e.g., centrifugal forces) resulting from the rotation of the rotor 10. The thickness of the cylinder 20 must be sized to accommodate the centrifugal forces of the contents of slots 16 and the end turn portions 30a. Because the end turn portions 30a of rotor winding 30 produce greater centrifugal forces than in the rotor body portion 30b of rotor winding 30, the thickness of the cylinder 20 may need to be thicker at its end turn portions than at the rotor body portion, as illustrated in FIG. 1.

The cylinder 20 thus eliminates the need for body wedges to restrain the body portion 30a of the rotor winding 30 and overcomes the problems encountered with the locking key arrangement of earlier attempts. Through the elimination of the body wedges, the cost for constructing the rotor 10 is reduced and the amount of copper forming the rotor windings 30 in each slot 16 is reduced. Furthermore, the need for slot teeth in the rotor 20 is eliminated since the function of the teeth was to act in conjunction with the wedges to restrain the rotor winding 30 against the rotational forces of the rotor 20. Those skilled in the art will thus appreciate that through the present invention, new latitude in the overall electrical machine design is enabled. Furthermore, the end turn portions 30a of the rotor winding 30 can be made tighter to thus result in lower core end losses, and the end turn portion blocking of the rotor winding 30 can be made tighter and with greater simplicity. Specifically, the retaining ring insulation, and winding and creepage blocks (up to 250 parts per rotor) can possibly be eliminated, and the rotor machining can be simplified since there are no required dovetails and possibly no required slots. Moreover, the pole area for the same amount of copper forming the rotor winding 30 can be increased.

The cylinder 20 includes a plurality of holes 22, 24. Each of the holes 22, 24 through the cylinder 20 extend radially from the inner circumference of the cylinder 20 to its outer circumference. The holes 22, 24 are formed during the filament winding process by virtue of removable dowels of a diameter equal to the hole size.

Figure 3:
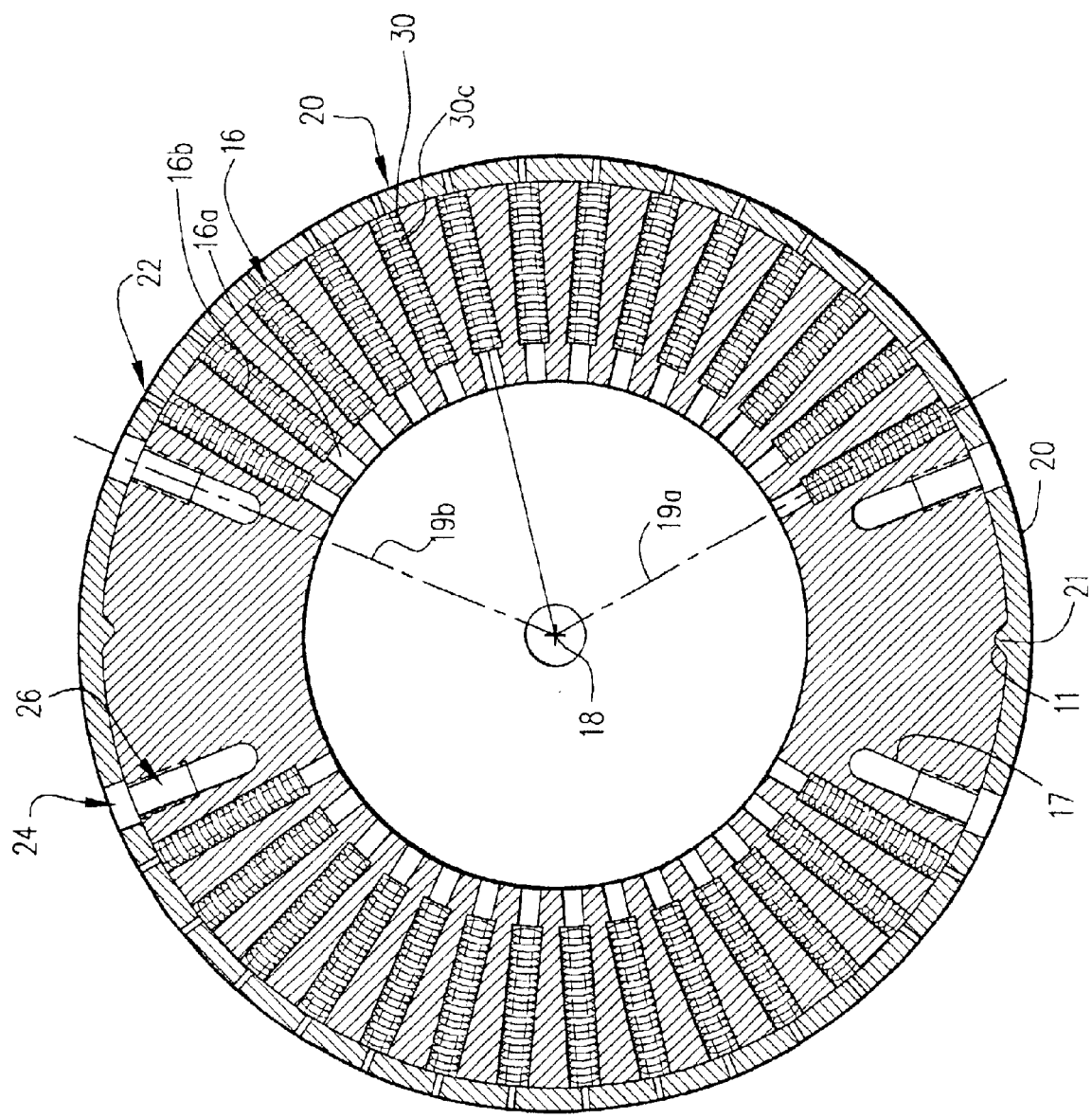
FIG. 3 is a cross-sectional view taken along line 3—3 of FIG. 1.

As illustrated in FIG. 3, the plurality of ventilation holes 22 in the cylinder 20 can be respectively aligned in both the radial and axial directions with the plurality of slots 16 and ventilation through-holes 30c. Specifically, each ventilation hole 22, each slot 16, and each ventilation through-hole 30c are radially aligned to thus share a common central axis 19a which extends radially outward from the rotational axis 18 of the rotor 10. Each of the ventilation holes 22 act in conjunction with the ventilation through-holes 30c to form a plurality of ventilation passages.

A fan 40 is disposed on an axial end of the cylinder 20 (see FIG. 1). The fan 40 produces a cooling medium which passes through the ventilation portion 16a and is distributed among the ventilation through-holes 30a and exits the rotor 10 via ventilation holes 22 of the cylinder 20. By utilizing the cylinder 20 with the ventilation holes 22 formed over the end turn portion 30a of the rotor winding 30, rather than a conventional retaining ring (which contains no ventilation holes), an enhanced cooling efficiency can be obtained with much lower cost. Additionally, the axial length of the rotor 10 can be reduced by, for example, 5 to 7 inches since no cooling space is required between the end of the rotor winding 30 and the axial end of the cylinder 20b, as is required in a conventional rotor using retaining rings to constrain the end turn portions 30a.

The plurality of holes 24 through the cylinder 20 are generally larger than the holes 22 and allow balance plugs 26 to be respectively inserted therethrough. In the exemplary embodiment illustrated in FIG. 3, four balance plugs 26 are shown. The holes 24 are respectively aligned with openings 17 formed in the rotor 10. Specifically, the holes 24 and the openings 17 are radially aligned with one another, respectively, to share a common central axis 19b which extends radially outward from the rotational axis 18 of the rotor 10. The balance plugs 26 can be respectively engaged into the openings 17 through the holes 24. Accordingly, the rotor 10 can be balanced so that its weight is evenly distributed.

As illustrated in FIG. 3, the cylinder 20 includes a plurality of protrusions 21 on its inner circumference. The rotor 10 includes a plurality of grooves 11 on its outer circumference. Each of the protrusions 21 on the inner circumference of the cylinder 20 engages into a corresponding groove 11 on the outer circumference of the rotor 10. In the exemplary embodiment, the cylinder 20 has two protrusions 21 and the rotor 10 has two corresponding grooves 11 located on diametrically opposing sides. Each of the protrusions 21 and each of the corresponding grooves 11 axially extend along the cylinder 20 and body portion of the rotor 10, respectively. Each of the protrusions 11 is engaged into a corresponding one of the grooves 21 so that the cylinder 20 can be effectively locked (i.e., secured) to the rotor 10.

Figure 4:
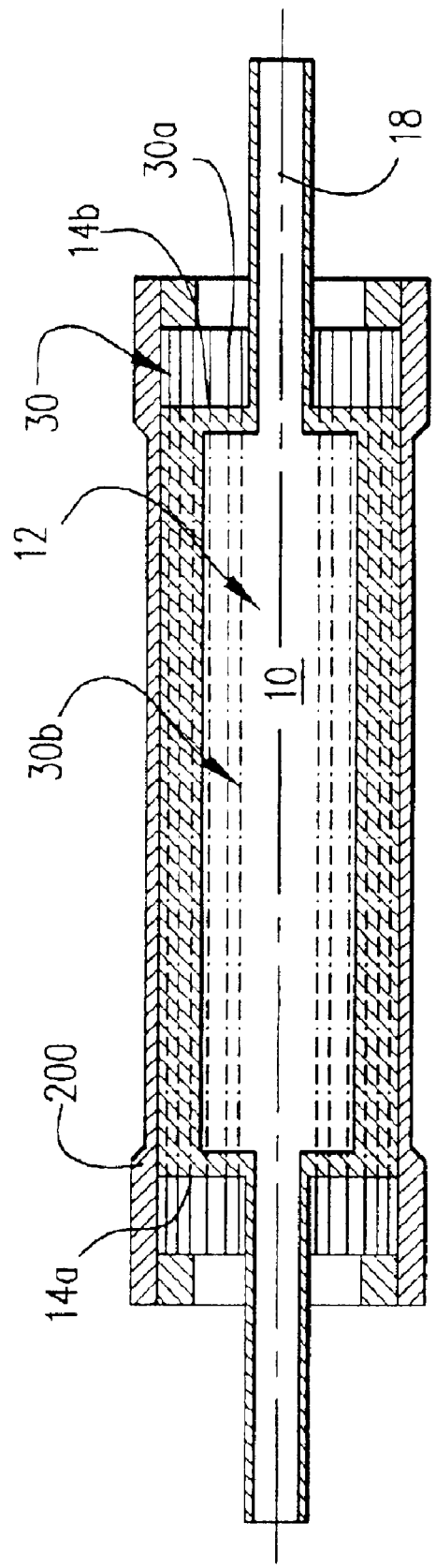
FIG. 4 is a cross-sectional view of a rotor assembly in accordance with a second exemplary embodiment of the present invention.

FIG. 4 illustrates a cross-sectional view of a second exemplary embodiment of the present invention in which reference numbers corresponding to parts previously described in the exemplary embodiment illustrated in FIGS. 1–3 remain the same. Only the differences will be discussed in detail.

FIG. 4 illustrates an electric machine including, inter alia, a non-metallic cylinder 200 arranged around the rotor 10. Cylinder 200 is similar to cylinder 20 of the exemplary embodiment illustrated in FIGS. 1–3. However unlike cylinder 20, no portion of cylinder 200 has a inner circumference which is smaller than the outer circumference of the cylindrical rotor 10. That is, the entire cylinder 200 has a inner circumference which is larger than the outer circumference of the cylindrical rotor 10. Specifically, cylinder 200 does not include ends 20b (see cylinder 20 in FIG. 2) which extend in a radial direction toward the central rotational axis 18. As illustrated in FIG. 2, the diameter of inner circumferences of the ends 20b of cylinder 20 are smaller than the diameter of outer circumference of the rotor 10. Since no portion of cylinder 200 has an inner circumference (and hence inner diameter) which is smaller than the outer circumference (and hence outer diameter) of the rotor 10 (including rotor winding 30 received within and extending axially beyond the rotor 10), cylinder 200 may be slid over the rotor 10 without obstruction. No part of cylinder 200 will prevent it from being slid over the rotor 10, thereby reducing the complexity of constructing the electric machine and hence construction costs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the exemplary embodiments discussed above include a single cylinder 20 or 200, multiple cylinders or rings may be substituted in its place. For example, an outer cylinder may surround an inner cylinder and/or a cylinder may be subdivided in a plane perpendicular to the rotational axis 18 to effectively form multiple cylinders.

What is claimed is:

1. An electric machine comprising:
   a rotor;
   a rotor winding disposed on said rotor, said rotor winding having a body portion and end turn portions; and
   a non-metallic cylinder arranged around said rotor to restrain both said body portion and said end turn portions of said winding against forces resulting from a rotation of said rotor;
   wherein no portion of an inner circumference of the cylinder is smaller than an outer circumference of the rotor;
   the cylinder has a plurality of holes defined therethrough; and
   said plurality of holes are a plurality of balance plug holes and said rotor includes at least one opening formed therein, one of said plurality of balance plug holes being aligned with said opening to allow a balance plug to be engaged into said opening through said one of the plurality of balance plug holes.

2. The electric machine of claim 1, wherein said rotor includes a body portion which extends along a rotational axis of said rotor and two end faces which axially oppose one another, and said cylinder extends along said rotational axis of said rotor so that said cylinder surrounds said body portion of said rotor and extends axially beyond both of said end faces.

3. The electric machine of claim 1, wherein said cylinder extends axially beyond said end turn portions of said rotor winding.

4. The electric machine of claim 1, further comprising a plurality of ventilation holes defined in the cylinder and wherein said rotor includes a plurality of slots formed therein for receiving said winding, said plurality of ventilation holes being respectively positioned with respect to ventilation through-holes in said winding to form a plurality of ventilation passages.

5. The electric machine of claim 1 further comprising a fan arranged at an axial end of said cylinder.

6. The electric machine of claim 1 wherein said rotor includes a groove on its outer periphery and said cylinder includes a protrusion on its inner periphery which engages said groove of said rotor.

7. An electric machine comprising:
a rotor;
a rotor winding disposed on said rotor, said rotor winding having a body portion and end turn portions; and
a non-metallic cylinder arranged around said rotor to restrain both said body portion and said end turn portions of said winding against forces resulting from a rotation of said rotor;
wherein the cylinder has a plurality of holes defined therethrough; and
said plurality of holes are a plurality of balance plug holes and said rotor includes at least one opening formed therein, one of said plurality of balance plug holes being aligned with said opening to allow a balance plug to be engaged into said opening through said one of the plurality of balance plug holes.

8. The electric machine of claim 7 wherein said cylinder is made of a graphite epoxy composite.

9. The electric machine of claim 8 wherein said cylinder is a single integral cylinder.

10. The electric machine of claim 7 wherein said rotor includes a body portion which extends along a rotational axis of said rotor and two end faces which axially oppose one another, and said cylinder extends along said rotational axis of said rotor so that said cylinder surrounds said body portion of said rotor and extends axially beyond both of said end faces.

11. The electric machine of claim 7, wherein said cylinder extends axially beyond said end turn portions of said rotor winding.

12. The electric machine of claim 7 further comprising a plurality of ventilation holes defined in the cylinder and wherein said rotor includes a plurality of slots formed therein for receiving said winding, said plurality of ventilation holes being respectively positioned with respect to ventilation holes in said winding to form a plurality of ventilation passages.

13. The electric machine of claim 12 further comprising a fan arranged at an axial end of said cylinder.

14. The electric machine of claim 7 wherein said rotor includes a groove on its outer periphery and said cylinder includes a protrusion on its inner periphery which engages said groove of said rotor.

* * * * *